F. S. INGOLDSBY.
DUMP CAR.
APPLICATION FILED JULY 7, 1917.

1,375,700.

Patented Apr. 26, 1921.
9 SHEETS—SHEET 1.

INVENTOR,
Frank S. Ingoldsby,
BY Bates & Macklin,
ATT'YS

F. S. INGOLDSBY.
DUMP CAR.
APPLICATION FILED JULY 7, 1917.

1,375,700.

Patented Apr. 26, 1921.
9 SHEETS—SHEET 3.

INVENTOR,
Frank S. Ingoldsby
BY
Bates & Mecklin,
ATTYS.

F. S. INGOLDSBY.
DUMP CAR.
APPLICATION FILED JULY 7, 1917.

1,375,700.

Patented Apr. 26, 1921.
9 SHEETS—SHEET 4.

INVENTOR,
Frank S. Ingoldsby,
BY Bates & Macklin,
ATTYS.

UNITED STATES PATENT OFFICE.

FRANK S. INGOLDSBY, OF PASADENA, CALIFORNIA, ASSIGNOR TO THE INGOLDSBY AUTOMATIC CAR COMPANY, OF CLEVELAND, OHIO, A CORPORATION OF WEST VIRGINIA.

DUMP-CAR.

1,375,700.

Specification of Letters Patent. Patented Apr. 26, 1921.

Application filed July 7, 1917. Serial No. 179,130.

*To all whom it may concern:*

Be it known that I, FRANK S. INGOLDSBY, a citizen of the United States, residing at 193 Millard Ave., Pasadena, in the county of Los Angeles and State of California, have invented a certain new and useful Improvement in Dump-Cars, of which the following is a full, clear, and exact description, reference being had to the accompanying drawings.

The most important general object of this invention is to improve the means for handling basic needs, such as grain and coal, with the least cost and delay. The present world war is emphasizing the value of this object.

This invention relates to general service dump cars whether of the gondola or box car type and is particularly concerned with so constructing such cars as to combine cheapness of construction with strength and economy of material, insure complete and clean dumping of the entire car bottom and tight joints when the doors are closed, while providing simple mechanism capable of the greatest ease and speed of operation.

Dumping box cars for the quick and cheap handling of grain are essential, yet no railroad has any such equipment. That it can be had, my various cars, patents and publications have been showing for more than twenty years. This particular invention will help to perfect these much needed dumping box cars for grain.

A prime feature of this invention is that tension can be substituted for torsion in the main members of the mechanism, thus making the construction much lighter, and also insuring its action, notwithstanding any permanent set which may occur through rough or long use.

A more specific object is to so arrange the mechanism of such cars that it may be operated for dumping, closing and locking from one point and by the same means. Another object is to provide a very simple effective door locking mechanism which may be capable of operation by the above means or by separate means. Another object is to construct a door raising mechanism capable of operating doors of the usual rectangular shape or triangular doors such as shown and described in my patent on dump cars, No. 1,256,323, issued February 12, 1918.

My invention is hereinafter more fully described in connection with the accompanying drawings illustrating a preferred embodiment thereof. The above and other objects will become apparent in the description and the essential characteristics are summarized in the claims.

Referring to the drawings, Fig. 22 is a perspective of the extension brackets attached to the hinged floor beams of the car for coacting with the locking and raising mechanism; Fig. 22ᵃ is a fragmentary view of a modification of the members shown in Fig. 22.

While I have shown and described torsional raising mechanism I have done so to illustrate that my operating mechanism at the end of the car is capable of ready adaptation to this or other kinds of door raising devices. It is to be understood, however, that an essential object of this invention is to secure the positive and permanent action of tension devices for raising and locking the doors.

Describing the parts by reference numerals, 1 and 2 indicate the sides, and 3 and 4 the end walls of a general service car shown as the gondola type but intended to illustrate any form of general service car having a normally flat dumping bottom.

The car shown is made up of sheet metal walls strengthened by side sill members in the form of large angle-irons 5 from which rise side stiffeners 7, also preferably in the nature of angle-irons, the side members extending between and are secured to end sills 8. 9 designates a central longitudinal sill connected with cross beams and body bolsters 10 arranged at spaced distances between the end sills. Between the corners of the car and the intersection of the body bolsters with the central sill, I arrange diagonal struts 12. The frame work thus provided for the bottom of the car is closed between the body bolsters, by rectangular doors 14 hinged to the central sill member, while the triangular openings formed between the body bolsters and the end sills are closed by triangular doors 15 and 16.

The arrangement of triangular doors at the end portions of the car, is for the purpose of providing the diagonal stiffening braces 12 for strengthening the car frame. This important feature is more fully described and claimed in my application for "dump cars" above mentioned. The doors 14 are hinged to the central sill member 9 by floor beams 18 carried on hinged pins 19, the floor beams extending along transversely beneath the doors supporting the same and reaching to the sides of the car. At the ends of these floor beams are secured plates 20 having upward extensions 21 each provided with a vertical slot-like opening adapted to receive wedge tongues 22 carried on members 23 secured between separated longitudinal strips 24 constituting locking bars.

The locking bars, as I term them, extend through openings 26 in the side stiffeners 7 and embrace wheels 28 somewhat larger in diameter than the width of the bar strips and adapted to ride on the outwardly turned flange of the side sill 5. It will be seen that when this bar is moved longitudinally in one direction to withdraw the wedges from the slotted tongues 21, the doors may be permitted to drop, dumping the load. Upon raising the doors, the bars 24 may be moved longitudinally of the car by any suitable means, to thrust the wedge tongues into the openings, locking the doors in their closed position and securely forcing them by simple wedging action into a tight fit with the surrounding members, thus insuring a very tight car bottom.

Figure 1:
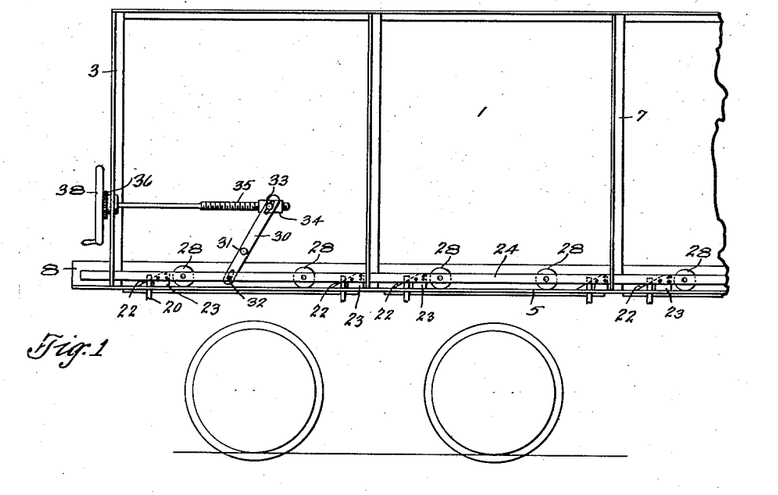
Figure 1 is a side elevation of a portion of a dump car equipped with my invention and showing particularly the door locking mechanism.
Figure 2:
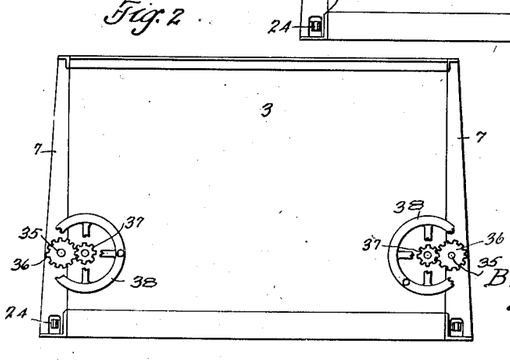
Fig. 2 is an end elevation of the same.

In Fig. 1 I have shown means for forcing the wedges tightly into a locking position, comprising a lever 30 hinged at 31 to the side of the car and pivoted at 32 to the bar 24, by a slot engaging a pin extending transversely between the strips comprising the bar, while at the upper end is a similar slot-and-pin engagement 33, on a nut 34 threaded onto a screw 35 journaled to the side of the car and extending to the end thereof and carrying a gear 36 adapted to be driven by a pinion 37 rotated by a hand wheel 38. This gear and pinion increases the power applied to the screw 35, while permitting the use of a large hand wheel without extending the same past the side of the car, and the lever 30, as shown, increases the power between the screw and the locking bar.

Figure 3:
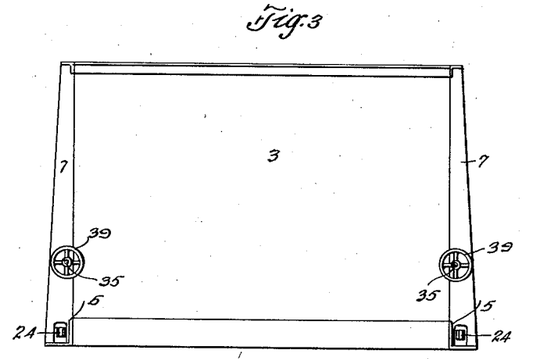
Fig. 3 is an end elevation showing an alternative arrangement of the wheel actuating the locking mechanism.
Figure 4:
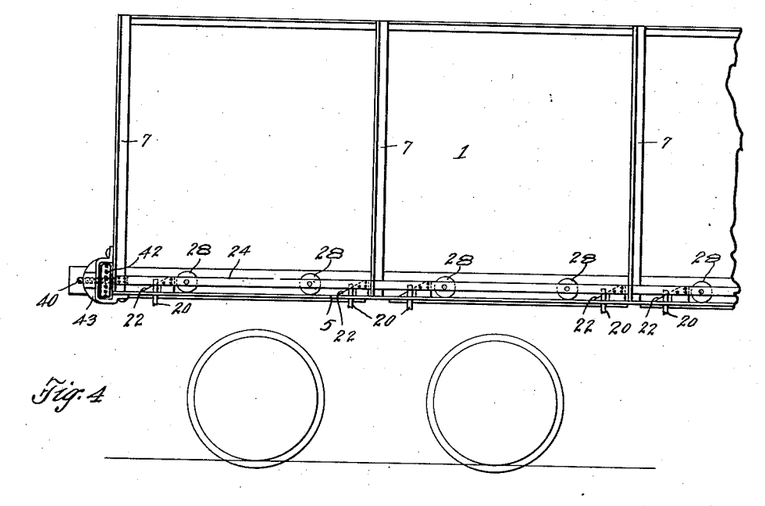
Fig. 4 is a side elevation similar to Fig. 1, illustrating still another method of actuating the locking means.
Figure 5:
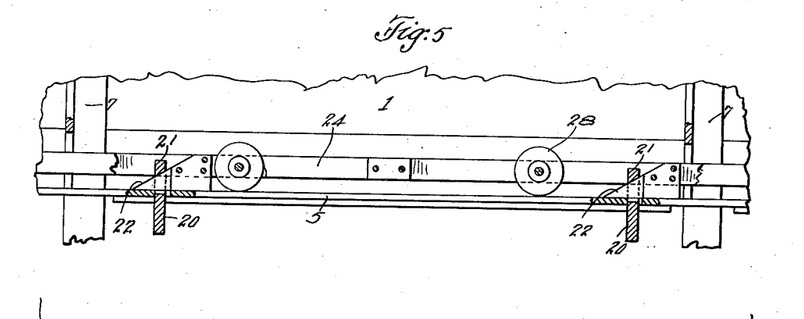
Fig. 5 is a fragmentary sectional detail of the longitudinally movable bar and door locking means.
Figure 6:
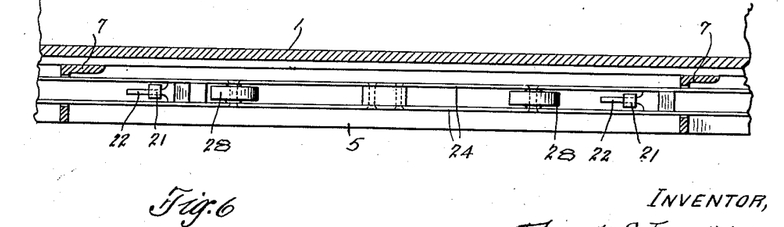
Fig. 6 is a similar section in the nature of a plan of such a door locking means.

In Fig. 3 is shown a more simple arrangement of the means for actuating the screw 35 which comprises merely a small hand wheel 39 secured to the screw 35 and mounted rigidly on the outer end of the same, thus eliminating the gears 36 and 37. In Fig. 4 is illustrated still another method of actuating the locking bar, which may be suitable for some car constructions. Here a screw 40 is rigidly connected to the strip of the bar while a nut 42 is threaded thereon and positioned by a keeper 43 and the end stiffener 7. Here I may secure the desired power for forcing the wedges into tight engagement with the wedge openings of the floor beams by the use of a lever thrust into openings in the periphery of the nut 42 to rotate it.

As shown, the doors comprise a single piece of metal carried on the floor beams and stiffened by downwardly turned flanges 45 and made tight, so no grain or other fine material can leak out, by means of the outturned flange 46. A Z section bar riveted to the door may take the place of these flanges if desired. At the side adjacent the hinges I prefer to provide a tight fit by means of narrow strips 47 secured to the door plate and having beveled surfaces fitting closely with convex shedding surfaces whether the door is opened or closed.

These shedding surfaces and this door construction are very effective in causing the car to be entirely emptied when the doors are released. Thus, with many materials, particularly grain and some forms of coal, no cleaning of the interior of the car is necessary. These advantageous results and the different methods of constructing such shedding surfaces and coacting door parts are fully described and claimed in my prior Patents Nos. 1,000,175–176–177, issued August 8, 1911.

The form and construction of the door-raising mechanism may be chosen, or governed somewhat, by the door arrangement, particularly by the method of hinging the triangular doors at the end portions of the car. I prefer to arrange the door 16 so that it may be hinged to the diagonal strut 12, and have its floor beam 13 extend outwardly to the side of the car, as above described, while at the narrow end of this door a short hinge 57 provides support. The doors 15 are supported on outwardly extending transverse floor beams 17 hinged to the central member and having locking means at their outer ends, while the narrow ends of these doors 15 are supported on short hinges 58. It will be seen (from the plan view of Fig. 8) that this provides a series of parallel outwardly extending supporting floor beams which may be locked or released simultaneously for each side of the car, by actuating the bar and wedges at that side. This arrangement of floor beams also provides for a very convenient and simple door-raising mechanism which will now be described.

Secured to the lower portions of the cross beams 10, are axially alined journals 50, at each side of the car. Carried in these journals are the bearing portions 52 of a rock shaft or raising bar having U-shaped offset sections, comprising crank arms 53 and connecting portions 54 between each of the adjacent bearings. Each portion 54 engages the two floor beams in its path whereby when the shaft is rocked upwardly it closes all of the doors on that side of the car. At the end portions of the car the member 54 of the offset raising bar may engage the beams 13 and 17. Thus this section raises the two triangular doors, while the other offset sections each raise one of the rectangular doors, but it will be seen that this arrangement might be used to raise triangular doors throughout the car.

In order to secure the most economical use of power applied to the raising bar or shaft, it is desirable that the offset portions should swing in an arc outwardly and downwardly about the bearing, so that the portions 54 engage the floor beams as far from the pivots as possible. Accordingly, I have arranged the plates 20 so that they form an extension of the bearing surface of the floor beams carried on the bars 54 of the raising shaft, and in order that the doors, when in their open position, may provide the steepest running slope possible, I have provided an outwardly and downwardly sloping cam surface 56 of the plate 20, extending to a horizontal surface 58. Thus when the doors are opened the portion 53 swings to the position shown in broken lines in Fig. 10, bringing the bar 54 off from the cam surface. In the raised position these portions 54 come onto the horizontal surface at the lower part of the plate 20, bringing the door to its closed position, while maintaining the crank arm 53 at an angle preventing the bar from holding the door up when the wedges are moved to release their engagement with the floor beams extensions.

Any suitable means may be used for rotating the rock shaft raising bars to raise the doors. I prefer to provide a mechanism operating the rock shafts on both sides of the car at the same time, whereby all the doors in the car may be closed at once, and upon the completion of the closing movement such mechanism may operate to automatically cause the moving of the wedges into tight locking engagement. As a preferred embodiment of such mechanism, I have shown, on an extension 51 of each raising bar, at one end of the car, a sprocket wheel 60, rigidly secured to this extension end and operated by a chain 61, each extending upwardly to separated sprocket wheels 63 secured to the end wall of the car. These sprockets 63 (shown in Fig. 12) are each rigid with spur gears 65, and one of these spur gears is also rigid with a sprocket wheel 66 driven by a sprocket chain 67 and running over a sprocket wheel 68 which is in turn rigid with a sprocket 69 driven by a sprocket chain 70. This sprocket chain 70 is driven by a small sprocket wheel 72 on a shaft 75 and connected therewith at intervals by mechanism to be hereinafter described, whereby the chains and sprockets and gears just described, may be operated by a single hand wheel 76 located at the end of the car to raise all of the doors at one time.

Figure 12:
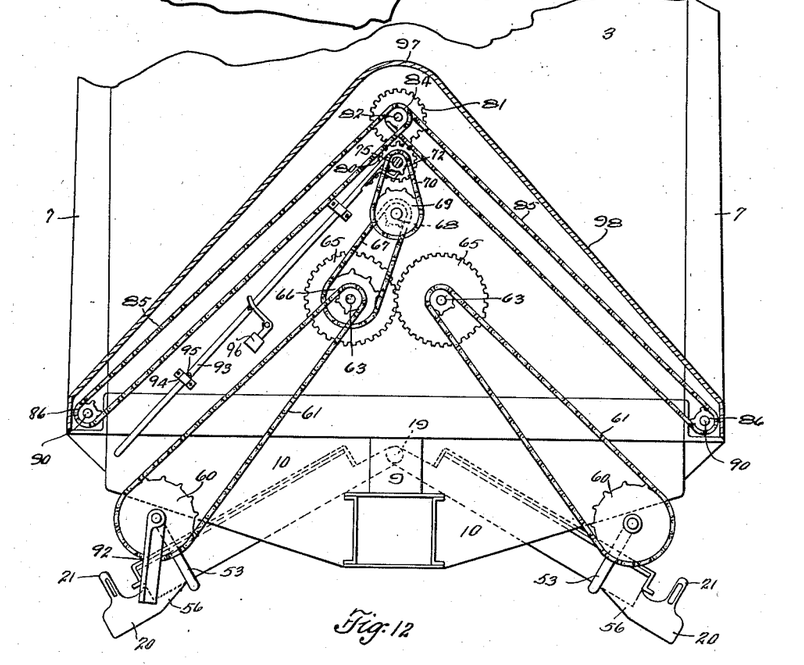
Fig. 12 is a sectional end elevation of the same.
Figures 13, 14, 15:
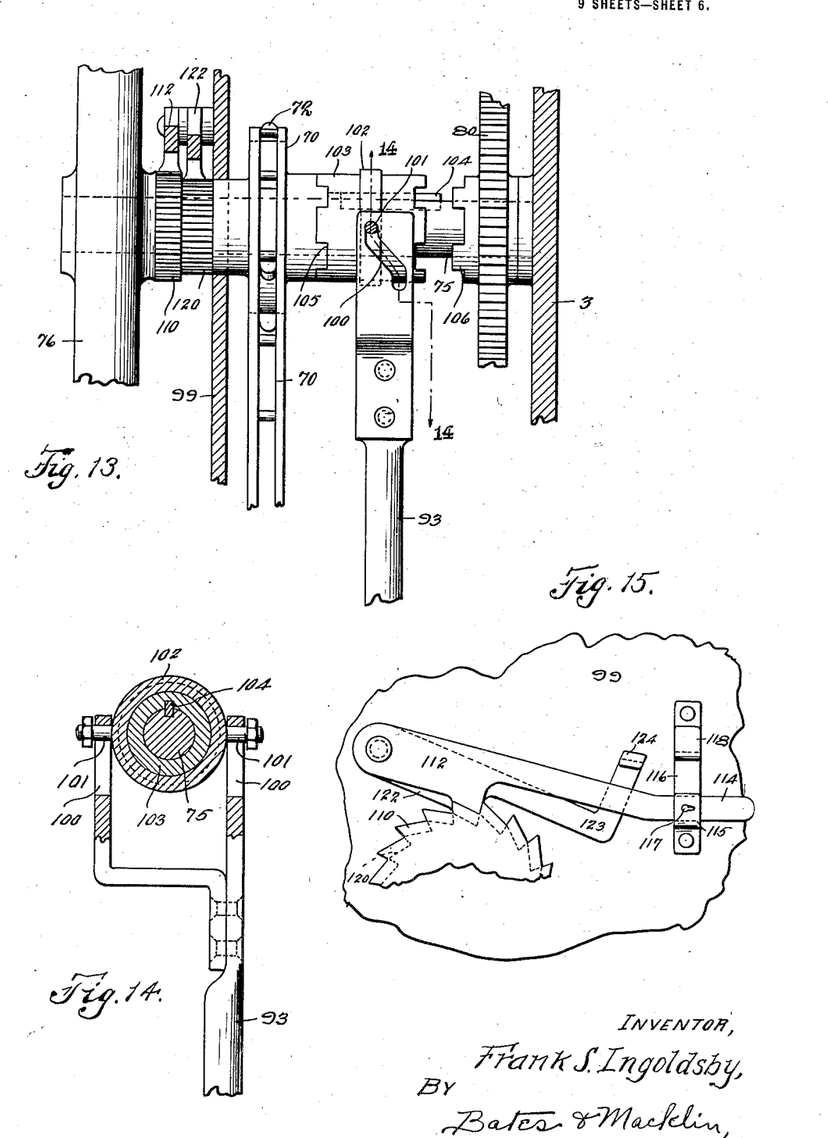
Fig. 13 is an enlarged sectional detail of parts of such mechanism on the hand wheel shaft.
Fig. 14 is a section taken on a plane indicated by the line 14—14 of Fig. 13.
Fig. 15 is a detail of the locking dogs for such mechanism.

It will be seen from Fig. 12 that the small sprocket 72 driving the large sprocket 69 through the chain 70, increases the force applied to the hand wheel. Another increase of force is obtained by the gear ratio of the sprockets 68 and 66, and still another increase by the ratio of the small sprocket 63 with the large sprocket 60 secured to the ends of the raising shaft.

On the shaft 75 is also a spur gear 80 driving a spur gear 81 rigid with a shaft 82 on which are rigidly mounted two sprocket wheels 84, driving sprocket chains 85 extending in opposite directions downwardly to sprockets 86 formed on the exterior of nuts engaging screws 90. These screws 90 may correspond to the screws 40 previously described in connection with Fig. 4. Upon the actuation of the sprocket nuts the longitudinal bars may be actuated to thrust the wedges into the locking members of the doors.

In raising the car doors it is desirable to have the hand wheel operated through a sufficient number of revolutions to bring the doors to their closed position, and then automatically disconnect the raising mechanism from the shaft 75 and at the same time connect the mechanism for actuating the locking bars with this shaft, whereby the continued movement of the hand wheel may cause the locking of the doors by actuating the chains 85, nuts 86 and longitudinally movable wedge bars. The mechanism for accomplishing the change of the connection of the power with the shaft 75 preferably comprises an outwardly extending arm 92 rigid on the extension 51 of one of the raising shafts which may impinge against the lower end of a shiftable rod 93 slidably mounted in keepers 94 and having its downward movement limited by a pin 95. When this arm comes in contact with the lower end of the rod 93, the continued upward movement of the shaft for raising the doors will cause the vertical or upward shifting of this rod to actuate a clutch mechanism, to be presently described, for disconnecting the door raising mechanism from the hand wheel shaft and causing the longitudinal bars to be shifted longitudinally consequent upon the continued movement of such hand wheel.

I prefer to provide a housing at the end of the car for completely inclosing this raising and locking mechanism and gearing. Such a housing is shown as comprising the end wall of the car, a rearwardly extending wall rounded over the gearing at 97 and then downwardly at 98, and an end wall 99.

At the upper end of the shifter rod 93, I have provided a bifurcated portion comprising a pair of separated strips in the nature of extensions of this rod. In these extensions are cam slots 100 engaging outwardly extending trunnions 101 of a ring 102 rotatably engaging an annular groove in a clutch member 103 splined and longitudinally slidable on the shaft 75, connection being provided by a key 104. The sprocket 72 which drives the sprocket chain actuating the raising of the doors, is shown as provided with clutch teeth 105 engaging corresponding clutch teeth on the adjacent end of the clutch member 103 so that when the shifter bar 93 is down the shape of the slot 100 is such that the clutch is urged into engagement with the clutch teeth of the sprocket 72.

When the shifter bar is raised by engagement of the arm on the door-raising shaft, the slot moving upwardly across the trunnions 101, withdraws the clutch teeth from engagement with the sprocket 72 and brings its teeth on the opposite end into engagement with teeth 106 on the gear 80. This connects the shaft 75 with the gear 80, whereupon the sprocket leading to the longitudinal wedge bars may be operated to withdraw or to force the wedges in, depending on whether these are actuated for the closing or opening operation.

In raising the car doors by rotating the hand wheel, it is desirable to hold the gain by means of a ratchet and dog, or similar device. For example, I have shown ratchet teeth 110, rigid with the hand wheel, and a dog 112 pivoted to the outer wall 99 of the casing and wedged into engagement with these ratchet teeth by gravity, thus preventing a reverse movement of the hand wheel and holding the gain of the raising movement of the doors. This dog preferably has an extended arm 114, which may engage a hook at 115 in the nature of a loose keeper permitting its vertical movement, and also serving to provide means for locking this dog into close engagement with the ratchet teeth preventing inadvertent or improper rotation of the hand wheel. This keeper preferably forms a portion of a bent bar 116. Through the outer portion of the guide hook 115 I provide an opening 117 with an elongated extension which registers with a similarly shaped opening in the extension 114 of the bar. Thus when a locking key having a shank adapted to pass through the round portion of this opening and a laterally extending tongue fitting the elongated portion, is passed through the keeper and the bar and turned, either manually or by gravity, this bar will be locked in position. Such a key may also be provided with an opening for a car seal. The upper portion of the bar is provided with a similar hook 118, which may receive the end of the dog 114 holding it out of engagement, when it is desired to rotate the hand wheel in a direction opposite to that permitted by the dog.

A ratchet 120 rigid with the sprocket wheel 72 actuating the raising mechanism, is engaged by a dog 122 having an extended arm 123 which is bent upwardly and hooked over at 124 to engage the arm 114, causing both dogs to be raised when the arm 114 is raised to the upper hook 118. A more complete description of the operation of the raising and locking mechanism of my car will now be given.

Assuming that the car doors are closed, and that the car is loaded, the first step for unloading is to break the seal and unlatch the lock at 117, permitting the arm 114 to be raised, bringing both dogs 112 and 122 out of engagement with their respective ratchet wheels. The hand wheel is then turned in the proper direction to move the wedge bars at the sides of the car to withdraw the wedges from their engaging members on the door. This motion is transmitted through the clutch member 103 on the hand wheel shaft, through the gear 80, to the gear 81, thence to the sprockets 84 and sprocket nuts 86, actuating the screws at the ends of the longitudinally movable bars 24. The rod 93 is at this time pressed upwardly by means of the arm 92 which is in its upper position when the doors are closed. As the wedges are withdrawn the doors are permitted to lower slightly, and just as the wedges are completely withdrawn the lowering movement has caused the arm 92 to move sufficiently to permit the rod 93 to move downwardly, throwing the clutch member 103 out of engagement with the gear 80 and into the intermediate space between the teeth 106 and 105. Thus as soon as the wedges have been entirely withdrawn from the locking members of the doors, the doors throughout the entire car bottom are dropped, quickly dumping the load.

As the doors reach their lowermost position they bump and oscillate somewhat, causing an interval during which the rod 93 moving downwardly may cause engagement of the teeth of the clutch member with the teeth 105 on the sprocket 72. Such engaging movement is made positive by a weighted bell crank 96 acting on a projection on the rod 93, as shown in Fig. 12. The parts are now in position for the raising movement. The hand wheel may now be operated in the direction opposite that given it to withdraw the wedges. The dogs having been lowered into engagement with their respective ratchets to hold the gain of the hand wheel, the power is transmitted through the clutch to the sprocket wheel 72 and thence to the offset crank shaft engaging the doors, and the continued movement of the hand wheel causes the doors to be brought substantially to their closed position. As the arm 92 reaches a position corresponding to that bringing the openings of the members 21 on the doors opposite the points of the wedges on the longitudinally movable bar, it impinges the rod 93, raising it and shifts the clutch member to the gear 80. While the ratchet 120 and its dog hold the gain made, the continued movement of the hand wheel is transmitted through the clutch to the gear 80, and then through the chain 85 to the longitudinally movable bars, actuating the nuts at the ends of the same and drawing the wedges tightly into position, and thus forcing every door in the car into a very tight engagement with its surrounding members and tightly closing the same. The locking member may now be thrust into the opening 117 and through the bar 114 and the seal applied to the car, if desired.

It will be noted that in the dumping of the car, the hand wheel is first turned to remove the wedges, whereupon the doors drop, causing the downward movement of the raising shaft, resulting in actuating the gearing leading up to the hand wheel, but as the clutch member 103 is thrown out of engagement with the gear 80 at the first part of the downward movement of the doors and as it has a slight interval of travel before reaching the sprocket 72, this motion is not transmitted to the hand wheel until the engagement of the clutch member with the sprocket, both the sprockets 72 and gear 80 being loose on the shaft except when engaged on the clutch member.

Accordingly, the hand wheel is not caused to rotate consequent upon the dropping of the doors, and as the rod 93 drops it moves the clutch member over against the teeth 105, which are rotating, during the dropping of the doors, so rapidly that such engagement is prevented until the doors reach their lowermost position. However, if the clutch teeth should catch, the hand wheel would be caused to spin, and for this reason it is desirable not to have any projecting handle which might strike and injure the operator, who needs only to grasp the rim of the hand wheel to rotate the same for withdrawing the locking wedges. It is also desirable to use a handle for rotating the hand wheel to raise the car doors. Therefore I provide a handle which may be folded into the rim of the wheel, except when being used to raise the car doors.

Figures 16, 17:
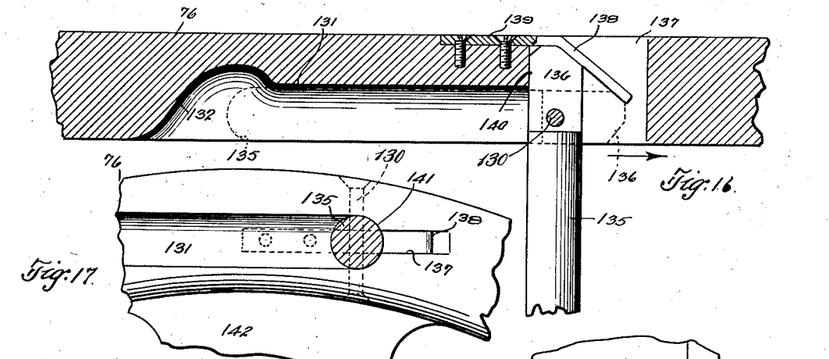
Figs. 16 and 17 are sectional details on a further enlarged scale of a folding handle for the operating wheel.

Such a handle is illustrated in Figs. 16 and 17, which may be considered as illustrative of any convenient folding handle. Here I have shown a substantially cylindrical handle member 135 of the desired length pivoted on a screw or like member 130 and adapted to swing into a cavity 131, having an enlargement 132 into which the thumb or finger may pass to engage the end of the handle for withdrawing it. The cylindrical portion of the handle 135 is integral with a flat tongue or extension 136, extending into a narrow slot portion 137 formed in the wheel rim. Projecting into this slot is an inwardly turned end 138 of a spring secured at 139 to the side of the hand wheel and within its general exterior, the bevel or inwardly extending portion of the spring engaging a beveled portion of the tongue 136 serving to hold it in its outwardly extending position, as shown in Fig. 16.

It will be seen that the handle, when in its operative position, has an abutment at 140 and an abutment at 141, at opposite sides of the pivot, the abutment 140 being one side of the slot itself, whereby the handle may rigidly resist strains applied in the direction of the arrow for closing and locking the doors, Fig. 16. It will not resist sufficient strain in the opposite direction to permit rotating the wheel by the handle when any power must be used, as in withdrawing the wedges, and for this reason the handle is closed when dumping the car.

These cavities and slots for the handle are preferably made opposite the spoke 142, of the hand wheel, which may be spread outwardly or webbed to provide additional strength at this point.

Referring now to the form of raising and locking mechanism described and shown in Figs. 18 to 22 inclusive, the form of longitudinal movable bar (corresponding to the bar 24) is altered slightly to accommodate connection with a different arrangement of chains. That is, instead of carrying the bar on wheels as heretofore described, I prefer to mount rollers on the car side for supporting the bar. Thus the bar 150 comprising two parallel members extends through openings in the side stiffeners 7, and rides on rollers 152, secured to the car side 1.

The bar is raised above the angle-bar 5 and the rollers 152 are given a raised portion running between strips of the bar, each having a groove accommodating a chain 153. These chains extend downwardly over these rollers through openings in the angle-bars 5 and are connected at their lower ends to extension brackets 155 secured to the hinged floor beams 13—17 and 18 of the doors, or are connected to the doors in any other convenient way.

At the lower end of the plate or plates comprising the car side I prefer to provide a tie member 156 through which extends a bolt 157 leading outwardly through the car side, one flange of the bar 5, and a bearing block providing a pivot for a hook 160. These hooks are shaped at their lower ends similar to those shown in my Patent No. 1,027,850, issued May 28, 1912, and coact with extensions 162 secured to the floor beams for causing the final tightening movement of the doors and for securely locking them in position.

Figure 18:
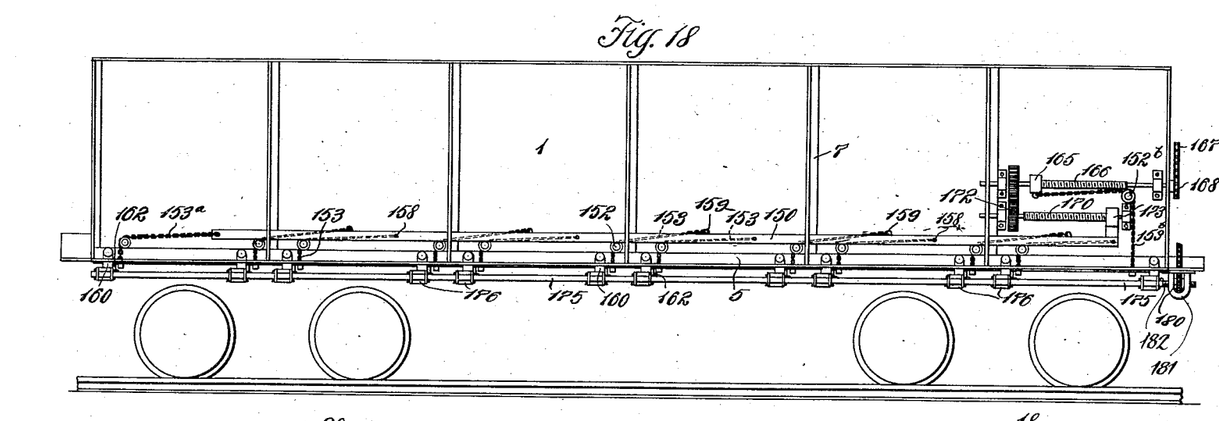
Fig. 18 is a side elevation of a car showing an alternative arrangement of the longitudinally movable bar and door raising and locking mechanism.
Figure 19:
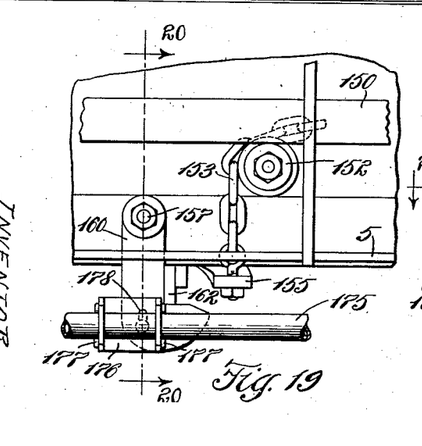
Fig. 19 is an enlarged detail in the nature of a side elevation of a portion of the raising and locking mechanism.
Figure 20:
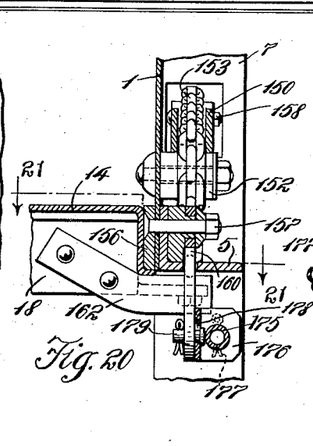
Fig. 20 is a sectional detail taken on a plane at right angles to the side of the car as indicated by the line 20—20 of Fig. 19.
Figure 21:
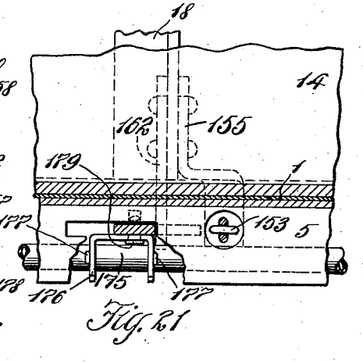
Fig. 21 is a horizontal sectional detail taken on the offset plane indicated by the line 21—21 of Fig. 20.

The members 155 to which the raising chains are attached, if so positioned that the chains extend over the pulleys 152 and then overlap each other as would occur with wide door openings requiring long chains, as indicated in Fig. 18, then the one chain is attached to a bolt indicated at 158 extending through the bar, while the other is attached to a raised bracket member 159 secured to the bar and having its attaching point slightly above the same.

Figure 28:
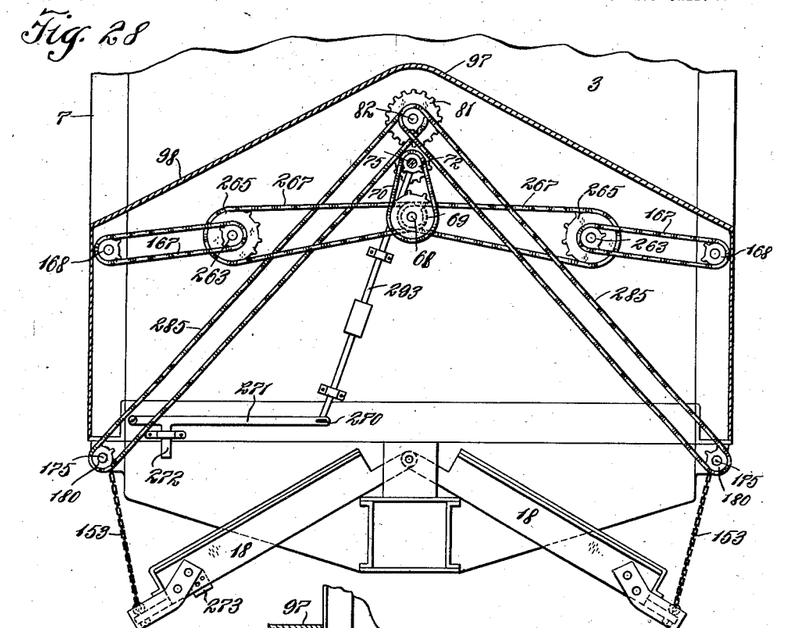
Fig. 28 is a sectional end elevation of mechanism similar to that shown in Fig. 12 and adapted for operating the door raising and locking mechanism shown in Fig. 18.
Figure 29:
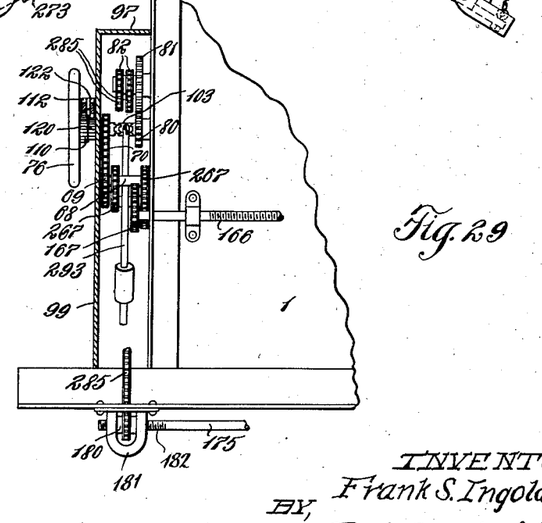
Fig. 29 is a sectional side elevation of these parts.

The chain 153$^a$ at the left hand end of Fig. 18 is connected with the end of the bar so that as the bar moves to the left to permit the doors to drop it is not projected past the end of the car. The chain 153$^b$ at the right hand end of the car, secured to the last floor beam adjacent to the end of the car, is carried over a pulley 152$^b$ and secured to a nut 165 on a screw 166 actuated by a chain indicated at 167 running over a sprocket 168 rigid with the screw. This sprocket corresponds to the sprocket 60 of Fig. 12 and is operated by similar mechanism as more clearly shown in Figs. 28 and 29 and is actuated by the mechanism above described, but the last multiplication of force is obtained by the screw 166.

In order to prevent the bar from extending past the end of the car at the actuating end and still secure positive actuation, it is stopped short and the chain 153$^b$ arranged as described, while the bar itself is actuated by a screw 170 connected with the screw 166 by a pair of spur gears indicated at 172, the end of the bar being connected to a nut 173 on the screw 170.

Figures 7, 10, 11:
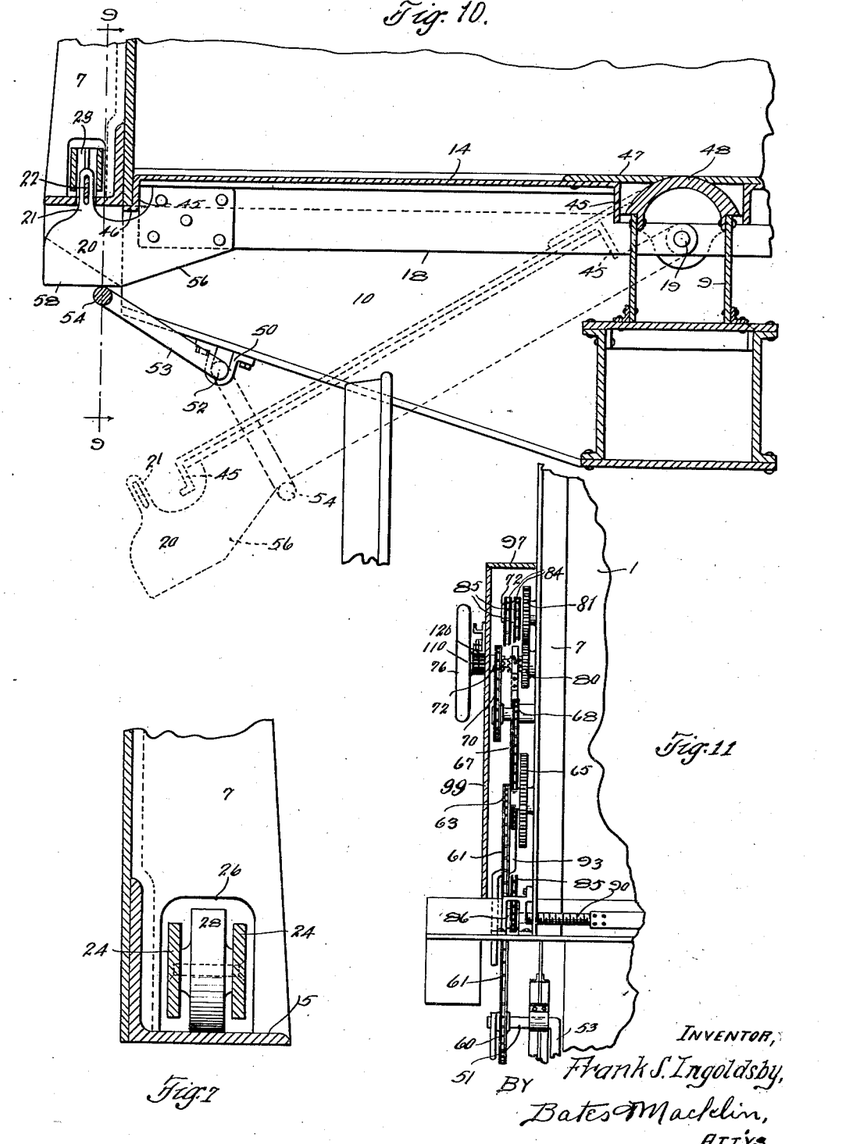
Fig. 7 is an enlarged vertical transverse section through the bar and adjacent portion of the car side.
Fig. 10 is a vertical transverse section on an enlarged scale through a portion of the car illustrating the door in its closed and open position and showing the locking and raising means.
Fig. 11 is a sectional side elevation of the operating gearing for the raising and locking means.

After the doors are raised to approximately their closed position by actuating the sprocket chain 167, screws 166 and 170 and drawing the bar to the right, (Fig. 18) the hooks 160 are swung into engaging position beneath the ends of the bars 162 and raises them by a lifting and wedging action to tightly close all of the doors. This actuation of these hooks is accomplished by a rod 175, preferably hollow, extending longitudinally of the car and having clips 176 positioned thereon by cotter-pins 177, the clip having a vertically elongated opening 178 engaging a pin 179 on the hooks whereby vertical movement of the pin, due to the swinging of the hooks, is permitted. The rod 175 may be actuated by a nut 180 having a series of openings in its periphery, whereby it may be turned in a keeper 181 by a lever or like tool and move a screw 182 forming an extension of the rod, as at 40 in Fig. 4, or it may be moved, as I prefer to move it, by an arrangement similar to Fig. 12, but more definitely shown in Figs. 28 and 29. The rod is preferably made tubular to combine strength with light weight, and the connections between it and the hooks are made very simple and convenient to assemble, by merely bending up the plates and providing holes to slide over the rod, after which the clips are positioned by the cotter pins, as described. The operation of this mechanism for dumping and closing the doors is as follows:

For operating the sprocket 168, and nut 180 by a single hand wheel mechanism, such as shown and described in connection with Figs. 11 and 12, I may use the same arrangement of shafts 75, 82 and 68, the shaft 75 carrying the shiftable clutch member 103 controlled by a shiftable rod 293 corresponding to the rod 93 to permit the hand wheel to drive either through the gears 80 and 81 to sprocket chains 285 or drive the sprocket 72 and chain 70 to actuate the sprocket 69 on the shaft 68. This shaft 68 carries two sprockets driving chains 267 extending toward the sides of the car from the shaft, and each in turn driving sprockets 265 rigid with small sprockets 263 which drive the chains 167. These chains 167 drive the small sprockets 168 on the screws 166 to actuate the door raising mechanism.

The rod 293 is suitably weighted and slidably mounted in keepers and is connected by a slot and pin connection at 270 at its lower end with a lever 271 pivoted adjacent the side of the car and having a downwardly extending tongue 272 projecting through a guide and adapted to engage a clip 273 secured to the hinged floor beam 18 of the end door. Thus, when the door is raised, this shoulder impinges the tongue 272, raising the lever 271 which in turn thrusts the rod 293 upwardly actuating the clutch 103, shifting it, as described in connection with Fig. 12, to drive the chains 285 actuating the door locking mechanism. The ratchets 110 and 120 are used with the dogs 112 and 122 in the same manner.

In opening the doors it is only necessary to actuate the hand wheel and mechanism for moving the rod 175 sufficiently to release the hooks 160 bringing all the hooks from beneath the door members simultaneously. In closing the doors the operation is reversed, the clutch 103 being shifted to cause driving through the chains 70, 267 and 167 to the sprockets 168 and screws 166 for actuating the longitudinal bar and drawing upwardly on all of the chains 153, 153$^a$ and 153$^b$. Upon the doors reaching their substantially closed positions, the lever 271 and rod 293 and clutch are shifted, whereby the continued movement actuates the chains 285 and nuts 180 of the rods 175 to cause the hooks to tightly lock all the doors.

Figures 22A, 22B, 23, 24, 25, 26, 27:
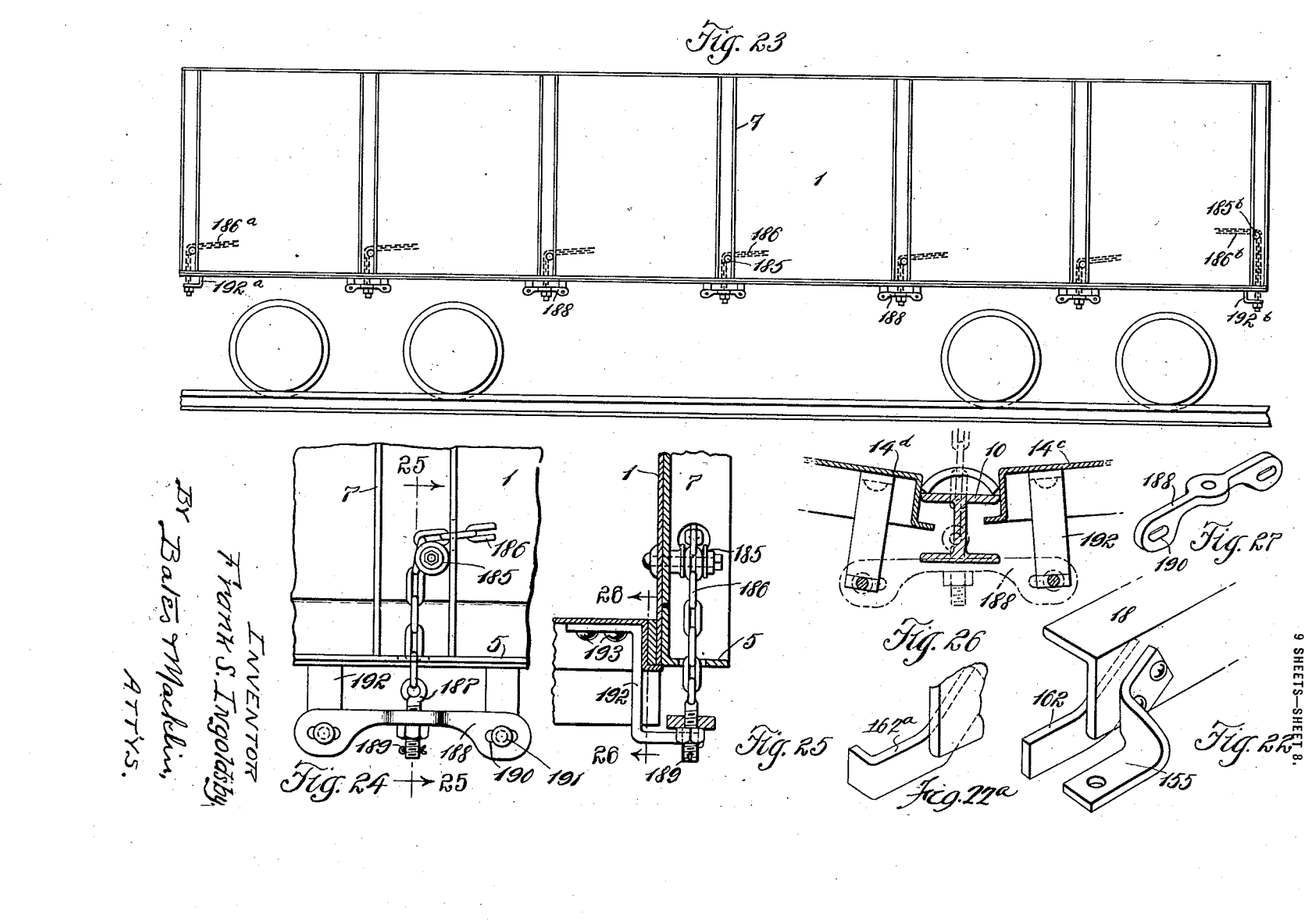
Fig. 23 is a side elevation of a car illustrating a modified form of the raising mechanism.
Fig. 24 is an enlarged detail showing the means for connecting two doors to a single raising member.
Fig. 25 is a vertical transverse section through the side of the car as indicated by the line 25—25 of Fig. 24.
Fig. 26 is a section on a plane parallel to the plane of Fig. 24 showing doors just before completing their closing movement, the plane of this section being indicated by the line 26—26 of Fig. 25.
Fig. 27 is a perspective of the connecting link whereby one chain acts on two doors.

The member 162 may readily be caused to interlock with the hooks 160, but with a car side stiffened as in the construction here shown, this is unnecessary. To accomplish this interlocking, however, it would only be necessary to turn the ends of the members 162 across the shanks of the hooks 70 as indicated in Fig. 22$^a$, and shift the pin 179 and the member 176 to clear the same.

Referring particularly to Figs. 23 to 27 inclusive, I have here illustrated still another method of connecting the chains with the doors, designed to allow positioning out of the path of the falling material as it is dumped from the car and only using about half the number of chains. That is, the chains are positioned between the doors, one chain serving two doors, along the car side, except at the ends of the series at the ends of the car.

In carrying out this method of construction the side stiffeners 7 are preferably channel-members, although angle members may be used, and within these channels are provided pulleys 185 having suitable grooves for the chains 186, depending from the pulleys midway between the ends of the floor beams and thus out of the path of the material falling downwardly over the doors when they are opened. The connection between the chains and the doors is shown as comprising an eye-bolt 187 extending through an equalizing lever 188 supported on a nut threaded onto the eye-bolt and secured by a cotter pin 189. This equalizing lever is shown as having slotted openings 190 engaging studs 191 projecting outwardly from the ends of bracket arms 192, which extend upwardly and then along the door to which they are secured by suitable rivets, as indicated at 193.

The chains 186 each extend through an opening in the side angle-iron 5 and through another opening in the flange of the side stiffener and may be connected to a raising bar. The chains 186$^a$ at the left hand end of the car are connected to a bracket arm 192$^a$ secured to the door similarly to the other bracket arms but turned toward the end of the car, thus bringing the downward extension of the chain out of the path of the material. A similar bracket 196$^b$ turned toward its respective end of the car is connected with a chain 186$^b$ running over a pulley 185$^b$ and may be connected with mechanism such as described in connection with the form of car shown in Fig. 18.

In raising and lowering, if one door moves faster or slower than the other, thus bringing them slightly out of alinement, the elongated slots and the outwardly pivoted equalizing bar compensate for such irregularity of door raising by the action illustrated in Fig. 26 where the doors 14$^c$ and 14$^d$ are at unequal heights but both are being raised by the connecting equalizing bar.

This form of connection with the doors may coöperate with the wedge action locking hooks above described or with those used and illustrated in my prior Patent No. 1,013,552, issued January 2, 1912, or may be arranged to coöperate with the wedge-locking mechanism hereinbefore described, if desired.

Figure 8:
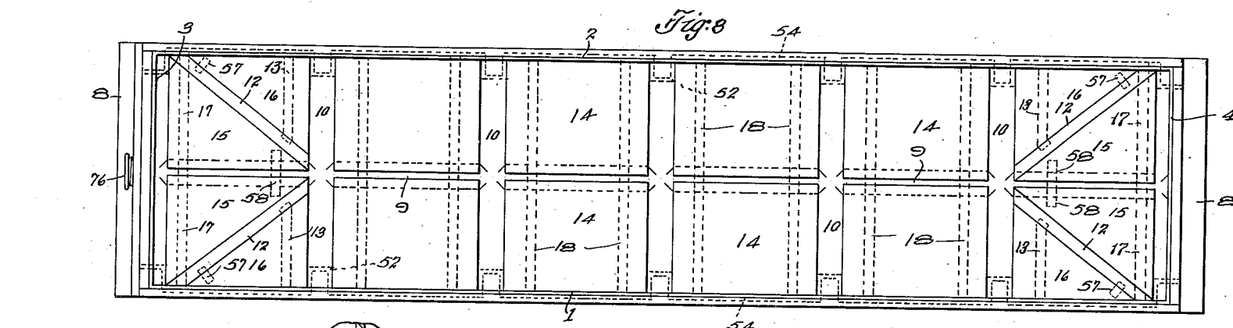
Fig. 8 is a plan of a general service car showing an arrangement of both rectangular and triangular doors.
Figure 9:
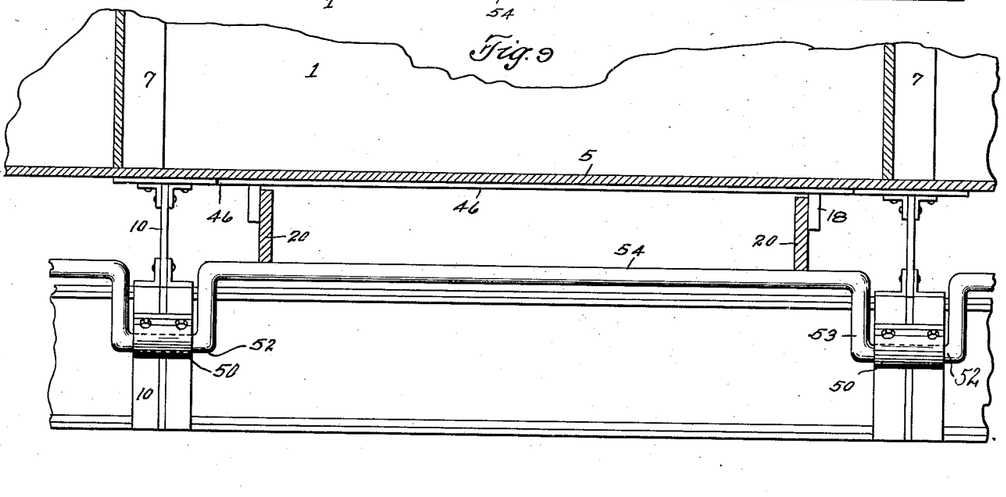
Fig. 9 is a vertical longitudinal section adjacent the side of the car substantially as indicated by the line 9—9 of Fig. 10.

It will be seen that both of the modified forms of door raising mechanisms as well as the locking mechanism described in connection with Figs. 18 to 21 may be used equally well with triangular or rectangular doors, or with a car door arrangement such as illustrated in Fig. 8, showing both forms of doors in one car bottom.

From the foregoing description it will be seen that I have provided a car having a very effective mechanism for raising and locking the doors with an operating mechanism therefor which, being constructed largely of sprocket wheels and chains, is of comparatively light weight, while providing the desired strength and permitting wide latitude for positioning the operating point. This raising mechanism is operated from a single point, which is in itself a very desirable feature in the operation of dump cars. It will also be seen that I have provided a very simple and yet effective method of securely locking the doors by a lifting and wedging action, insuring tight joints and relieving the raising mechanism of the weight on the load. Furthermore, my raising mechanism at the end of the car may be conveniently used with different forms of members connected with the doors, permitting the use of the offset shaft or of chains connected to the longitudinal bar at the car side where the chains are overlapped or where the chains are arranged to come between the doors out of the path of the falling material. Accordingly, cars of the general service type may be arranged with different shaped doors to open the entire bottoms and, by my invention, these may be combined with a door raising mechanism particularly adapted to raise all of the doors at one time, in addition to this simple effective wedge locking mechanism. In my preferred method the operator closes and locks the entire car by one continuous turning of the hand wheel, and by reversing this movement he unlocks and opens the entire car.

Having thus described my invention, what I claim is:

1. In a dump car, the combination with hinged dumping doors having rigid extensions extending to the side of the car, locking means coacting with said extensions, a bar carrying locking devices and extending longitudinally along the car side, a screw rigid with the bar, a nut thereon having sprocket teeth, and a chain and sprocket gearing for actuating the nut.

2. In a dump car, the combination with a dumping door, a member rigid with the door and extending to the car side, locking means coacting therewith including a bar carrying wedging devices, rollers on which the bar is mounted, means for longitudinally shifting the bar to cause the locking wedges to coact with the extension members of the doors or to release the same therefrom, and raising means for the door independent of the bar.

3. In a dump car, the combination with a dumping door, of a raising mechanism therefor, a locking member secured to the door, a coacting locking member carried by the side of the car, rollers on said last mentioned locking member, and means at the end of the car for actuating the raising mechanism and for operating the coacting locking member.

4. In a dump car having a substantially flat bottom throughout, the combination with dumping doors opening from the bottom, of a door raising mechanism, means for actuating said mechanism, locking members secured to the doors and extending to the car side, coacting locking members positioned at the car side, a longitudinally shiftable member having rollers and adapted to be moved along the car side for actuating the locking means, and means for causing such longitudinal movement.

5. In a dump car, the combination of dumping doors arranged in the bottom along each side of the car, mechanism for raising the doors at each side, wedging means for completing the closing movement comprising members on each of the doors extending to the car side, a longitudinally movable member and wedge members actuated thereby coacting with the members on the doors, and means at the end of the car for raising the doors and actuating the wedging means.

6. In a dump car, the combination of a series of doors having members adapted to extend upwardly along each side of the car, a closing means for each series, wedging means coöperating with the extension members for tightening and locking the doors in their closed position located at each side of the car, and a single prime mover at the end of the car for actuating all of said means.

7. In a dump car, the combination of a series of doors along each side of the car, a raising means for each series, means for tightening and locking the doors in their closed position at each side of the car, and a single manually operated member at the end of the car for actuating all of said means, said member comprising a screw, a nut having sprocket teeth thereon, and chain and sprocket gearing.

8. In a dump car, the combination of a plurality of hinged dumping doors, each door having an extension thereon, a raising means therefor, means comprising a plurality of wedges coöperating with the extensions for locking the doors, mechanism for raising all of the doors and for locking the doors including a single prime mover, an automatically controlled device for shifting the operating connection with the prime mover from the raising mechanism to the locking mechanism.

9. In a dump car, the combination of a plurality of hinged dumping doors, a raising means therefor, means for locking the doors by a wedge action, mechanism actuated from one place at the end of the car for raising all of the doors and for locking the doors including a prime mover, an automatically controlled device for shifting the connection with the prime mover from the raising mechanism to the locking mechanism allowing the wedges to complete the raising movement of any or all of the doors, such operating connection with the locking mechanism remaining established while releasing the locks but not while the doors are dropping.

10. In a dump car, the combination of a series of dumping doors, the doors adjacent to the ends being of one shape and the intermediate doors of different shape, each having a floor beam extending to the car side, raising mechanism coacting with the beams, locking mechanism at the car side, said locking mechanism comprising a wedge, a screw and a nut movable along the screw, and means at the end of the car for actuating the raising and locking means.

11. In a dump car, the combination of a series of doors along each side of the car some of which are rectangular and hinged to the central sill and others of which are triangular, all of said doors having locking members extending to the car side, a series of devices coacting with the locking members for holding the doors closed, and means comprising sprocket wheels and chains for actuating said devices simultaneously for all of the doors.

12. In a dump car, the combination of a series of doors along each side of the car some of which are rectangular and others of which are triangular, a rock shaft having offset sections engaging beneath the doors, and means for rotating the rock shaft, comprising sprocket chains and gearing mounted on the end of the car.

13. In a substantially flat bottom dump car, the combination of a series of doors along each side of the car some of which are rectangular and hinged to the central sill, others of which are triangular and hinged to diagonal beams, all of said doors having extensions reaching to the car side, a raising device beneath the doors for raising all of the doors, and means comprising a series of wedges coacting with the members at the car sides for locking the doors closed.

14. In a dump car, the combination of a series of dumping doors, a raising mechanism for the series, wedge action locking means for holding the doors closed, a member extending longitudinally along the car side for actuating the locking means, a prime mover, sprocket chains and gearing connecting the prime mover with the raising mechanism and with the locking mechanism.

15. In a dump car, the combination of a series of dumping doors, a raising mechanism for the series, wedge action locking means for holding the doors closed, a member extending longitudinally along the car side for actuating the locking means, a screw device for actuating the longitudinally movable member, a prime mover, sprocket chains and gearing connecting the prime mover with the raising mechanism and with the screw actuating mechanism.

16. In a dump car, the combination with a series of hinged dumping doors along the car bottom, of floor beams extending to the car side, plates secured to the floor beams and having upward extensions with openings therethrough, wedges coacting with said extensions by entering the openings, means for actuating the wedges, and a raising mechanism including a rock shaft having offset sections engaging the floor beams and said plates, said plates having downwardly sloping surfaces coacting therewith.

17. In a substantially flat bottomed dump car, the combination with a series of dumping doors along each side of the car, of a raising mechanism engaging beneath the doors of each series and having an actuating gear at the end of the car, locking devices for doors at each side of the car, each having actuating gears at the ends, a hand wheel at the end of the car and sprocket gearing and chains connecting the hand wheel with each of said operating gears.

18. In a dump car, the combination of a series of dumping doors along each side of the car, raising mechanism engaging beneath each series having an operating member at the end of the car, operating mechanism for each series at the side of the car having an operating member at the end, a single prime mover at the end of the car, and gearing connecting both operating members with said prime mover.

19. In a dump car, the combination with dumping doors, of a door raising mechanism, a door locking mechanism, a prime mover for actuating both of said mechanisms, means connecting the prime mover with said mechanisms, including a clutch member adapted to be shifted consequent upon a position of the doors, whereby in closing the doors the prime mover is connected with the raising mechanism for the greater portion of the movement, and then with the locking mechanism to complete the closing.

20. In a dump car, the combination of door raising mechanism, wedge acting door locking mechanism, means for actuating both of said mechanisms comprising a prime mover and connecting gearing, said gearing including a clutch member, means controlled by the positions of the doors for actuating said clutch to shift the operating connection from the raising mechanism to the locking mechanism consequent upon the closing of the doors.

21. In a dump car, the combination of door raising mechanism wedge acting door locking mechanism, means for actuating both of said mechanisms comprising a prime mover and connecting gearing, said gearing including a clutch member, means controlled by the position of the doors for actuating said clutch to cause operating connection during unlocking and to prevent connection while the doors are dropping.

22. In a dump car, the combination with door raising mechanism and door locking mechanism, of a prime mover for actuating both said mechanisms, a shaft connected with the prime mover, a clutch member splined to said shaft, gearing including a loose gear on said shaft connected with the locking mechanism, a shiftable rod for causing the clutch member to coact with either of said gears, according to the position of said doors, and means connected with the doors for actuating said rod.

23. In a dump car, the combination with door raising mechanism and door locking mechanism, of a hand wheel for actuating both of said mechanisms, a ratchet on said hand wheel for holding the gain during the raising, a ratchet on a member of the locking mechanism for preventing the unlocking, and means for releasing both said ratchets at one time.

24. In a dump car, the combination with door raising and door locking mechanism, of a hand wheel at the end of the car for actuating both said mechanisms, gearing connecting the hand wheel with the raising mechanism, a separate system of gears connecting the hand wheel with the locking mechanism, ratchets connected with each of said sets of gears adjacent the hand wheel, one of said ratchets holding the gain during the raising and the other during the gain of locking, a pawl for each of the ratchets, and a connection between said pawls whereby the pawl for the locking mechanism may release the other pawl, while allowing independent actuation of each.

25. In a dump car, the combination with door raising and door locking mechanism, of a hand wheel and gearing connecting same with the raising and locking mechanisms, ratchets in said gearing, adjacent pawls coacting with said ratchets, the pawl for the locking mechanism having an extension adapted to cause the release of the other pawl when raised, a latch for the pawl for the locking mechanism adapted to receive a car seal.

26. In a dump car, the combination with a dumping door, locking means comprising a wedge coacting therewith for holding the door closed, raising means for bringing the door into a position to be engaged by the locking means, and mechanism for actuating the raising and locking means characterized by being so arranged that the raising and locking action is accomplished through the use of tension members.

27. In a dump car, the combination with dumping doors, wedge acting locking devices for holding the doors closed, raising devices for the doors, a hand operating mechanism for actuating the raising and locking means, said raising and locking means having its principal members adapted to act through the application of tension.

In testimony whereof, I hereunto affix my signature.

FRANK S. INGOLDSBY.